(12) United States Patent
Lee et al.

(10) Patent No.: US 11,135,786 B2
(45) Date of Patent: Oct. 5, 2021

(54) ADDING A SEGMENT OF FIBER-REINFORCED THERMOPLASTIC FILAMENT IN A CURVE

(71) Applicant: Arevo, Inc., Milpitas, CA (US)

(72) Inventors: Christopher Thomas Lee, Sunnyvale, CA (US); Steven George Manuel, San Mateo, CA (US)

(73) Assignee: Arevo, Inc., Milpitas, CA (US)

( * ) Notice: Subject to any disclaimer, the term of this patent is extended or adjusted under 35 U.S.C. 154(b) by 303 days.

(21) Appl. No.: 16/505,541

(22) Filed: Jul. 8, 2019

(65) Prior Publication Data
US 2021/0008817 A1  Jan. 14, 2021

(51) Int. Cl.
| | | |
|---|---|---|
| *B29C 70/38* | (2006.01) |
| *B29C 70/06* | (2006.01) |
| *B29C 59/04* | (2006.01) |
| *B29K 101/12* | (2006.01) |
| *B29K 105/08* | (2006.01) |
| *B33Y 30/00* | (2015.01) |
| *B29C 64/118* | (2017.01) |
| *B29C 64/321* | (2017.01) |

(Continued)

(52) U.S. Cl.
CPC ............ *B29C 70/382* (2013.01); *B29C 70/06* (2013.01); *B29C 59/046* (2013.01); *B29C 64/106* (2017.08); *B29C 64/118* (2017.08); *B29C 64/205* (2017.08); *B29C 64/209* (2017.08); *B29C 64/218* (2017.08); *B29C 64/268* (2017.08); *B29C 64/321* (2017.08); *B29C 70/38* (2013.01); *B29C 70/384* (2013.01); *B29K 2101/12* (2013.01); *B29K 2105/08* (2013.01); *B33Y 30/00* (2014.12)

(58) Field of Classification Search
CPC ..... B29C 70/38; B29C 70/382; B29C 70/384; B29C 70/06; B29C 59/046; B29C 64/205; B29C 64/321; B29C 64/118; B29C 64/209; B29C 64/106; B29C 64/268; B29C 64/218; B29K 2105/08; B29K 2101/12; B33Y 30/00
USPC .................................................. 264/136, 308
See application file for complete search history.

(56) References Cited

U.S. PATENT DOCUMENTS

| | | |
|---|---|---|
| 4,097,324 A | 6/1978 | Emmel |
| 5,041,179 A | 8/1991 | Shinno et al. |

(Continued)

OTHER PUBLICATIONS

Chris Marshall, "How to Apply Plastic Laminate," Woodworker's Journal, Oct. 2, 2014.

(Continued)

*Primary Examiner* — Joseph S Del Sole
*Assistant Examiner* — Lawrence D. Hohenbrink, Jr.
(74) *Attorney, Agent, or Firm* — McGeary Cukor LLC; Jason Paul DeMont; Kenneth Ottesen

(57) ABSTRACT

In additive manufacturing, a method of adding a segment of fiber-reinforced thermoplastic filament. Adding a segment of filament involves three tasks: (1) determining where the segment of filament should be added, (2) depositing the segment of filament at the desired location, and (3) tamping the segment of filament to ensure adhesion and eliminate voids. Tamping the segment of filament is performed by steering a wheel along the filament. In accordance with the illustrative embodiment, the wheel is steered around a yaw axis that is offset from the wheel's axis by a distance s, where s is a positive real number.

18 Claims, 11 Drawing Sheets

(51) Int. Cl.
  *B29C 64/218* (2017.01)
  *B29C 64/106* (2017.01)
  *B29C 64/205* (2017.01)
  *B29C 64/268* (2017.01)
  *B29C 64/209* (2017.01)

(56) References Cited

U.S. PATENT DOCUMENTS

| | | |
|---|---|---|
| 7,836,931 B2 | 11/2010 | Slyne |
| 10,076,870 B1* | 9/2018 | August ................ B29C 64/205 |
| 2014/0288893 A1* | 9/2014 | Blom ...................... G06F 30/23 |
| | | 703/1 |
| 2018/0236723 A1 | 8/2018 | Susnjara et al. |

OTHER PUBLICATIONS

Officer Monica Lozza, Written Opinion of ISA, International Application No. PCT/US2020/038896, dated Sep. 22, 2020.
Officer Monica Lozza, International Search Report, International Application No. PCT/US2020/038896, dated Sep. 22, 2020.

* cited by examiner

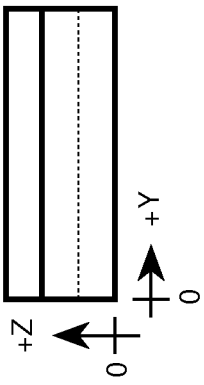
Figure 2c - Supporting Structure 106
(Orthographic Side View)
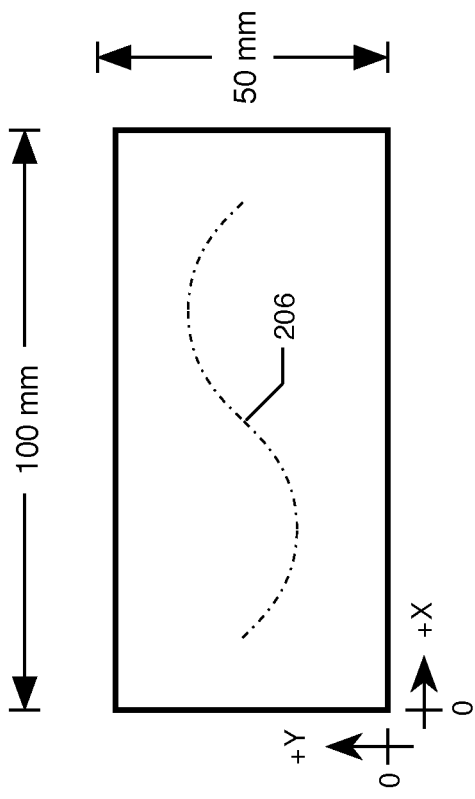
Figure 2a - Supporting Structure 106
(Orthographic Top View)
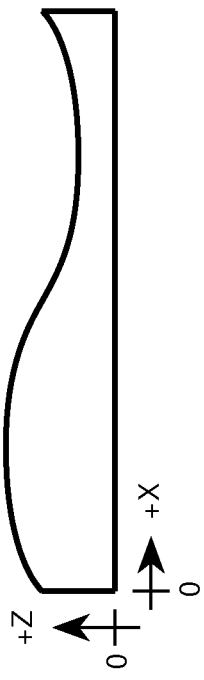
Figure 2b - Supporting Structure 106
(Orthographic Front View)

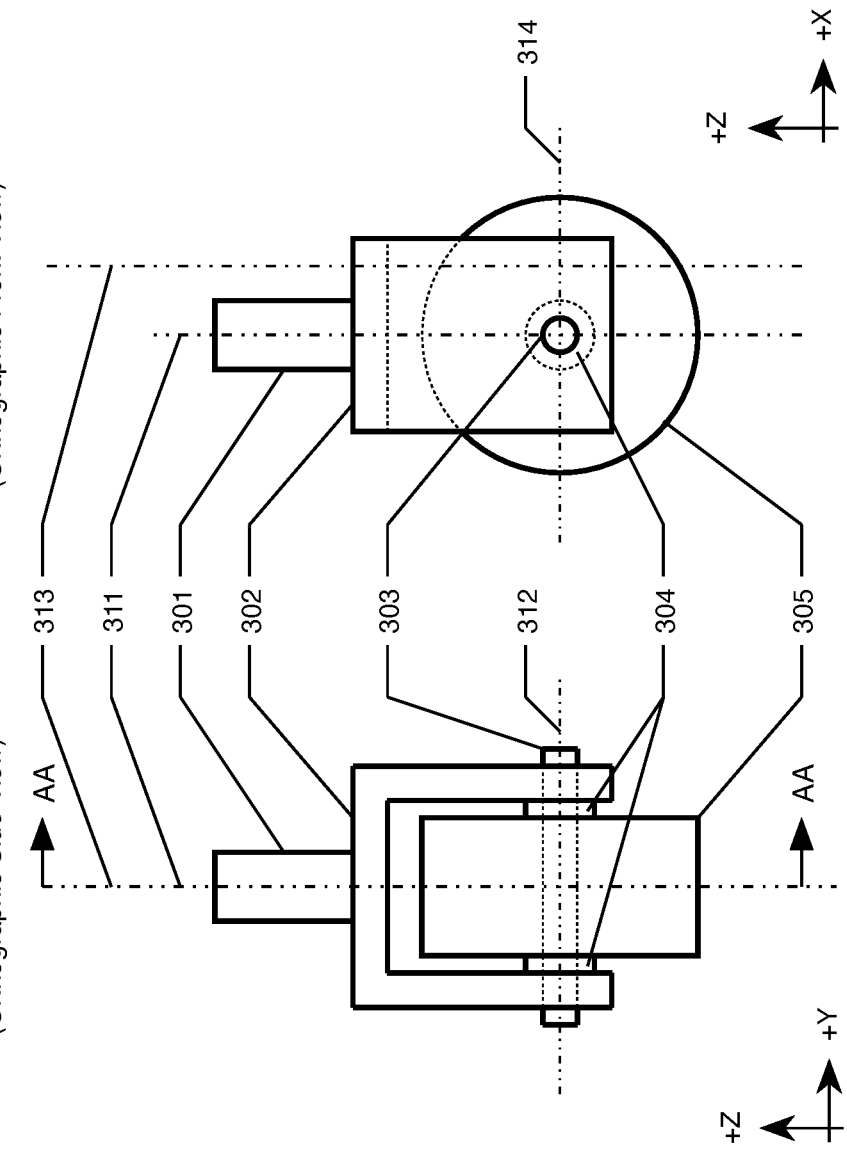

Tamping Tool 108
(Orthographic Top View)

ADDING A SEGMENT OF FIBER-REINFORCED THERMOPLASTIC FILAMENT IN A CURVE

FIELD OF THE INVENTION

The present invention relates to additive manufacturing in general, and, more particularly, additive manufacturing processes that use segments of fiber-reinforced thermoplastic filament as their elemental unit of fabrication.

BACKGROUND OF THE INVENTION

In the same way that a building can be constructed by successively adding bricks at specific locations and in a specific order, it is well known in the field of additive manufacturing that an article of manufacture can be fabricated by successively adding segments of fiber-reinforced thermoplastic filament at specific locations and in a specific order. A segment of filament is long, thin, and resembles a wet spaghetti when it is heated above a first temperature and a dry spaghetti when it is cooled below a second temperature.

Adding a segment of filament involves three tasks:
(1) determining where each segment of filament should be added,
(2) depositing each segment of filament at the desired location, and
(3) tamping each segment of filament to ensure adhesion and eliminate voids. Each of these will be discussed in turn.

The task of determining where each segment of filament should be placed is performed by an engineer, a computer-aided design system, or both. Although the task can be performed before the first segment of filament has been added, it can also be performed in real-time during manufacturing to compensate for any discrepancy between where a segment of filament was actually added in contrast to where it should have been added. The location where the longitudinal axis of a segment of filament should be added is called the "target path."

A target path can comprise:
(i) one or more straight portions, or
(ii) one or more planar curved portions, or
(iii) one or more non-planar curved portions, or
(iv) any combination of i, ii, and iii.

Because a segment of filament cannot defy gravity and float in air, the segment of filament must be wholly or partially deposited onto the surface of a supporting structure. Short segments of filament can be cantilevered or suspended, but substantial portions of the segments must be directly undergirded. The supporting structure for a segment of filament can be, but is not limited to:
(i) a build plate, or
(ii) a mold, or
(iii) a mandrel, or
(iv) a scaffold, or
(v) one or more previously added segments of filament, or
(vi) any combination of i, ii, iii, iv, and v.

Because the target path represents the location where the longitudinal axis of a segment of filament should be added, the target path is near—but not coincident with—the surface of the supporting structure. In most cases, the target path follows the contour of the surface of the adjacent supporting structure.

The task of depositing a segment of filament at the desired location involves laying down a length of the segment of filament so that the longitudinal axis of the segment exactly coincides with the target path.

The task of tamping a segment of filament involves pressing the filament into the underlying supporting structure to ensure:
(i) the cohesion/adhesion of the filament to the supporting structure, and
(ii) the elimination of air pockets (i.e., voids), which would weaken the final article of manufacture.

Typically, the task of tamping a segment of filament is accomplished by steering a wheel along the length of filament in a similar manner to how laminates and veneers are rolled.

In general, the success of additive manufacturing with segments of filament depends on the ability of the system to add each segment of filament exactly along the target path. Alas, there are circumstances in which this is not readily achievable.

SUMMARY OF THE INVENTION

Some embodiments of the present invention are capable of adding a segment of filament to a supporting structure without some of the costs and disadvantages for doing so in the prior art. In particular, some embodiments of the present invention are able to add a segment of filament to a supporting structure with more spatial precision than in the prior art.

In some embodiments of the prior art, the task of depositing a segment of filament is finished before tamping the segment is begun. In other words, a segment of filament is deposited along a target path, and, after all of the filament has been deposited, the segment is then tamped. For a variety of reasons, this is disadvantageous.

In some alternative embodiments of the prior art—and in accordance with the illustrative embodiment—the task of depositing is performed concurrently with the task of tamping. To help understand this, consider four adjacent portions of a segment of filament:
(1) a first portion of the segment of filament that has been deposited and is being tamped,
(2) a second portion of the segment of filament, adjacent to the first portion, that is being deposited, and
(3) a third portion of the segment of filament, adjacent to the second portion, that is about to be deposited, and
(4) a fourth portion of the segment of filament, adjacent to the third portion, that is to be deposited after the third portion is deposited.

In this context the inventors of the present invention discovered that when a target path contains a curve (either planar or non-planar), the segment of filament is added outside of the target path instead of along the target path (as shown, for example, in FIG. 5, where the location of filament 111 does not coincide with target path 206).

To understand the problem, the reader must understand how the second portion is guided into the target path for deposition. In accordance with the prior art and the illustrative embodiment, the second portion is not directly guided into the target path. No machinery or mechanism directly touches the second portion.

Instead, the second portion is guided, indirectly, by virtue of its position between the first and third portions. In other words, as long as it is free to move, the second portion will exist in a straight line between the first and third portions because of the tension between the first and third portions.

Whereas the first portion's location while being tamped is fixed, the third portion's location is being moved laterally in order to guide the second portion into the target path. To accomplish this in a curve, the third portion must be moved outside of the curve on a tangent of the curve. Thereafter, while the second portion is tamped on the target path, the fourth portion's location is being moved laterally in order to guide the third portion into the target path.

In practice, however, the inventors discovered that the wheel is simultaneously:
 (i) tamping the first portion of the segment of filament, and
 (ii) pinching the second portion while it is outside of the target path, which prevents it from being guided into the target path.

This problem could be ameliorated by using a wheel with a small radius but that does not eliminate problem and there are disadvantages to using a small wheel.

Another solution involves changing the way that the wheel is steered along the filament. In the prior art and in accordance with the illustrative embodiment, the wheel is steered along the filament so that the wheel's yaw axis intersects and advances along the target path. The prior art and the illustrative embodiment, however, choose different lines for the wheel's yaw axis. These lines are partially defined with respect to the line around which the wheel is substantially symmetric—the wheel's pitch axis.

In the prior art, a line that intersects the wheel's pitch axis is chosen as the wheel's yaw axis. In contrast, and in accordance with the illustrative embodiment, a line that is offset from the wheel's pitch axis is chosen as the wheel's yaw axis.

The magnitude of the offset depends on several factors, including:
 (i) the radius of the wheel, and
 (ii) the cross-sectional dimensions of the filament, and
 (iii) the degree to which the filament is compacted when it is tamped, and
 (iv) the curvature of the target path in relation to the curvature of the wheel.

Furthermore, because the curvature of a target path can change at different locations along the target path, the magnitude of the offset can change at different locations along the target path, and, therefore, the magnitude of the offset—and the location of the wheel's yaw axis relative to its pitch axis—is dynamically adjusted as the wheel advances along the target path.

The illustrative embodiment comprises: depositing a filament on a surface of a supporting structure along a target path; and tamping the filament onto the supporting structure with a wheel by steering the wheel along the filament; wherein the wheel comprises: (i) a pitch axis around which the wheel is substantially symmetric; and (ii) a circumferential surface that comprises: (ii-a) a nip line segment where the circumferential surface exerts maximum radial force on a first length of the filament, and (ii-b) a pinch line segment where the wheel first pinches a second length of the filament between the circumferential surface and the supporting structure so that any movement of the second length of the filament parallel to the pitch axis is substantially constrained; and (iii) a yaw axis that: (iii-a) is perpendicular to the pitch axis, and (iii-b) has a non-zero offsets from the pitch axis, wherein s is a positive real number, and (iii-c) intersects the pinch line segment; and (iv) a roll axis that intersects the pitch axis and the yaw axis and is perpendicular to the pitch axis and the yaw axis; and wherein steering the wheel comprises moving the wheel so that the yaw axis intersects and advances along the target path.

BRIEF DESCRIPTION OF THE DRAWINGS

FIG. 2a depicts an orthogonal top view of supporting structure 106 in accordance with the illustrative embodiment of the present invention.

FIG. 2b depicts an orthogonal front view of supporting structure 106 in accordance with the illustrative embodiment of the present invention.

FIG. 2c depicts an orthogonal side view of supporting structure 106 in accordance with the illustrative embodiment of the present invention.

FIG. 3a depicts an orthogonal side view of tamping tool 108 in accordance with the illustrative embodiment of the present invention.

FIG. 3b depicts an orthogonal front view of tamping tool 108 in accordance with the illustrative embodiment of the present invention.

DETAILED DESCRIPTION

Figure 1:
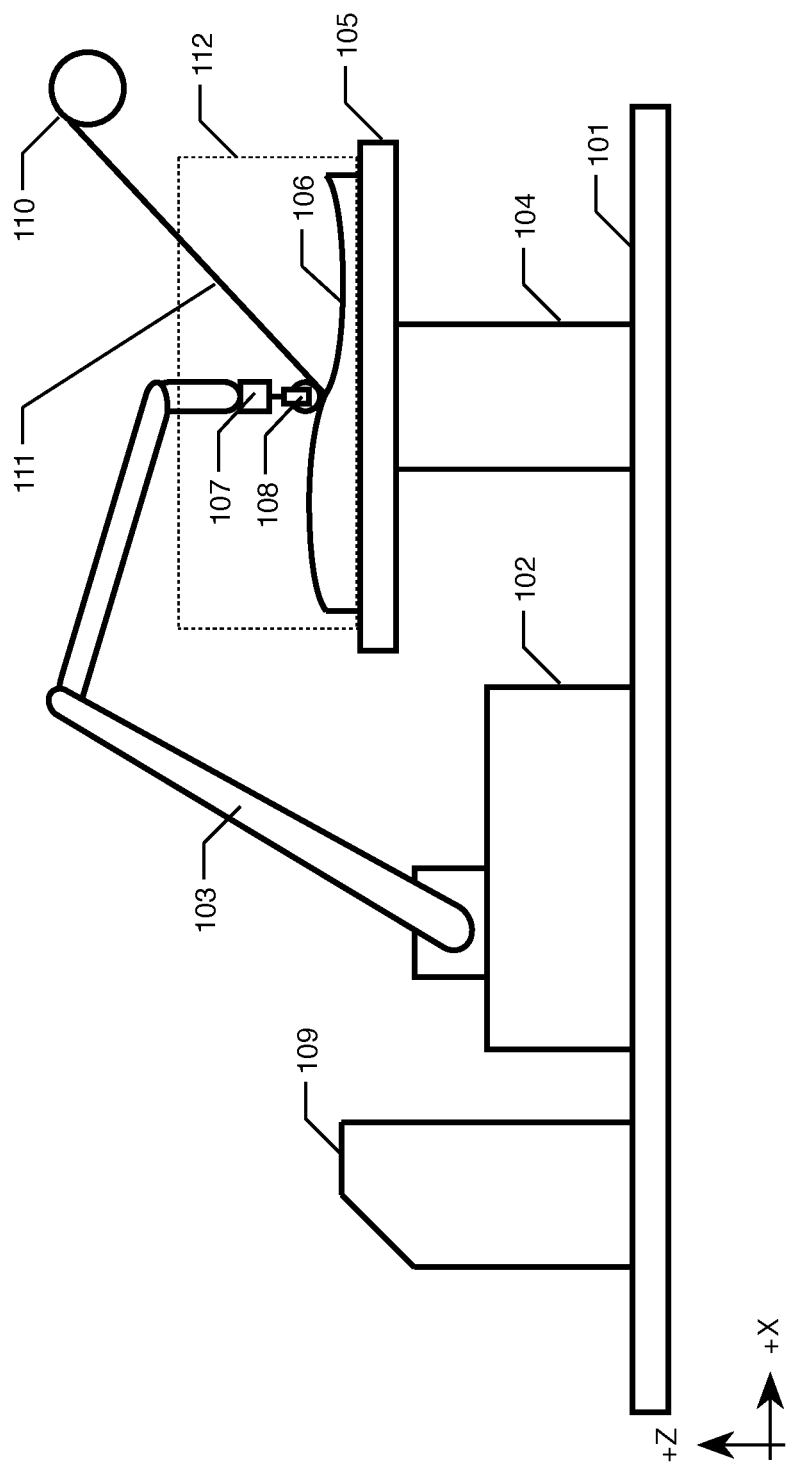
FIG. 1 depicts an illustration of the salient components of additive manufacturing system 100 in accordance with the illustrative embodiment of the present invention.

FIG. 1 depicts an illustration of the salient components of additive manufacturing system 100 in accordance with the illustrative embodiment of the present invention. Additive manufacturing system 100 comprises: platform 101, robot mount 102, robot arm 103, build plate support 104, build plate 105, supporting structure 106, deposition head 107, tamping tool 108, controller 109, filament reel 110, filament 111, and build volume 112. The purpose of manufacturing system 100 is to fabricate an article of manufacture by successively depositing finite lengths of filament on top of each other.

Platform 101 is a rigid structure that ensures that the relative spatial relationship of robot mount 102, robot arm 103, deposition head 107, and tamping tool 108 are maintained and known with respect to build-plate support 104, build plate 105, and supporting structure 106. It will be clear to those skilled in the art how to make and use platform 101.

Robot mount 102 is a rigid and stable support for robot arm 103. It will be clear to those skilled in the art how to make and use robot mount 102.

Robot arm 103 comprises a six-axis mechanical arm that is under the control of controller 109. A non-limiting example of robot arm 103 is the IRB 4600 robot offered by ABB. Robot arm 103 is capable of depositing a segment of fiber-reinforced thermoplastic filament from any three-dimensional coordinate in build volume 112 to any other three-dimensional coordinate in build volume 112 with deposition head 107 at any approach angle. Robot arm 103 can move tamping tool 108 in:

i. the +X direction,
 ii. the −X direction,
 iii. the +Y direction,
 iv. the −Y direction,
 v. the +Z direction,
 vi. the −Z direction, and
 vii. any combination of i, ii, iii, iv, v, and vi, while rotating the approach angle of tamping tool 108 around any line, any planar curve, and any non-planar curve within build volume 112. It will be clear to those skilled in the art how to make and use robot arm 103.

Build plate support 104 is a rigid and stable support for build plate 105 and supporting structure 106. Build plate support 104 comprises a stepper motor—under the control of controller 109—that is capable of rotating build plate 105 (and, consequently supporting structure 106) around an axis that is normal to the X-Y plane. It will be clear to those skilled in the art how to make and use build plate support 104.

Build plate 105 is a rigid support onto which supporting structure 106 is rigidly affixed so that it cannot move or rotate independently of build plate 105. It will be clear to those skilled in the art how to make and use build plate 105.

Supporting structure 106 comprises a plurality of finite lengths of filament that have been deposited and tamped into the shape depicted in FIGS. 2a, 2b, and 2c.

Deposition head 107 comprises hardware necessary to (i) deposit a finite length of filament 111 along target path 206 (shown in FIG. 2a) on supporting structure 106, and to (ii) tamp the filament into supporting structure 106 using tamping tool 108, which is a sub-assembly of deposition head 107. Deposition head 107 is described in detail in U.S. Pat. No. 10,076,870, entitled "Filament Guide," issued on Sep. 18, 2018, which is incorporated by reference for the purposes of describing deposition head 107. Furthermore, ancillary details about deposition head 107 are described in (i) U.S. Pat. No. 10,195,786, entitled "Filament Heating in 3D Printing Systems," issued on Feb. 5, 2019; and
 (ii) U.S. Pat. No. 10,046,511, entitled "Alleviating Torsional Forces on Fiber-Reinforced Thermoplastic Filament," issued on Aug. 14, 2018; and
 (iii) pending U.S. patent application Ser. No. 15/854,676, entitled "Depositing Arced Portions of Fiber-Reinforced Thermoplastic Filament," filed Dec. 26, 2017;

all of which are incorporated by reference. It will be clear to those skilled in the art, after reading this disclosure and the incorporated documents, how to make and use alternative embodiments of the present invention that use a combination deposition head/tamping wheel.

Controller 109 comprises the hardware and software necessary to direct build volume 112, robot arm 103, deposition head 107, and build plate support 104, in order to fabricate the article of manufacture. It will be clear to those skilled in the art how to make and use controller 109.

Filament reel 110 is a circular reel that stores 1000 meters of filament 111 and feeds that filament to deposition head 107. It will be clear to those skilled in the art how to make and use filament reel 110.

Filament 111 comprises a tow of reinforcing fibers that is substantially parallel to its longitudinal axis. In accordance with the illustrative embodiments, filament 111 comprises a cylindrical towpreg of contiguous 12K carbon fiber that is impregnated with thermoplastic resin. The cross-section of filament 111 is circular and has a diameter of 200 µm.

In accordance with the illustrative embodiment, filament 111 comprises contiguous carbon fiber, but it will be clear to those skilled in the art, after reading this disclosure, how to make and use alternative embodiments of the present invention in which filament 111 has a different fiber composition.

It will be clear to those skilled in the art, after reading this disclosure, how to make and use alternative embodiments of the present invention in which filament 111 comprises a different number of fibers (e.g., 1K, 3K, 6K, 24K, etc.). It will be clear to those skilled in the art, after reading this disclosure, how to make and use alternative embodiments of the present invention in which the fibers in filament 111 are made of a different material (e.g., fiberglass, aramid, carbon nanotubes, etc.).

In accordance with the illustrative embodiments, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature Tg.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed article.

In some alternative embodiment of the present invention, the filament comprises a metal. For example, and without limitation, the filament can be a wire comprising stainless steel, Inconel (nickel/chrome), titanium, aluminum, cobalt chrome, copper, bronze, iron, precious metals (e.g., platinum, gold, silver, etc.).

Build volume 112 is the region in three-dimensional space in which robot arm 103 is capable of depositing and tamping filament 111. Supporting structure 106 exists completely within build volume 112.

FIGS. 2a, 2b, and 2c depict orthographic front, side, and top views of supporting structure 106 in accordance with the illustrative embodiment.

In accordance with the illustrative embodiment, supporting structure 106 has a rectangular footprint and is 100 mm wide (i.e., in the Δx direction) and 50 mm deep (i.e., in the Δy direction). The bottom surface of supporting structure 106 (i.e., the surface adjacent to build plate 105) is planar, adjacent to build plate 105, and parallel to build plate 105. The top surface of supporting structure 106 is non-planar, continuous (i.e., comprises no discontinuities), and described by the equation:

$$z = s(x, y) = \left[10 \sin\left(\frac{2\pi x}{100}\right) + 20\right] \text{mm} \qquad \text{Eq. (1)}$$

where x is a real number in the range 0≤x≤100.

Although supporting structure 106 has a rectangular footprint, it will be clear to those skilled in the art, after reading this disclosure, how to make and use alternative embodiments of the present invention in which the supporting structure has any footprint.

Although supporting structure 106 has a footprint of 100 mm×50 mm, it will be clear to those skilled in the art, after reading this disclosure, how to make and use alternative embodiments of the present invention of any size.

Although supporting structure 106 has a bottom surface that is planar, it will be clear to those skilled in the art, after reading this disclosure, how to make and use alternative embodiments of the present invention in which the bottom surface has any form (e.g., planar, non-planar, irregular, convex, concave, hemispherical, etc.).

Although supporting structure 106 has a bottom surface that is continuous, it will be clear to those skilled in the art, after reading this disclosure, how to make and use alternative embodiments of the present invention in which the bottom surface comprises one or more discontinuities.

Although supporting structure 106 has a bottom surface that is adjacent to build plate 105, it will be clear to those skilled in the art, after reading this disclosure, how to make and use alternative embodiments of the present invention in which one or more portions of the bottom surface are not adjacent to the build plate.

Although supporting structure 106 has a top surface that is non-planar, it will be clear to those skilled in the art, after reading this disclosure, how to make and use alternative embodiments of the present invention in which the top surface has any form (e.g., planar, irregular, convex, concave, hemispherical, etc.).

Although supporting structure 106 has a top surface that is continuous, it will be clear to those skilled in the art, after reading this disclosure, how to make and use alternative embodiments of the present invention in which the top surface comprises one or more discontinuities.

In accordance with the illustrative embodiment, a length of filament is to be deposited and tamped onto the top surface of supporting structure 106. In particular, the filament is to be deposited onto supporting structure 106 so that the longitudinal axis of the filament is to exactly coincide with a non-planar space curve called target path 206. Because the filament has a circular cross-section and a diameter of 200 μm, target path 206 is represented parametrically by the vector function:

$$p(t)=x(t)i+y(t)j+z(t)k \qquad \text{Eq. (2)}$$

where:

$$x(t)=[80t+10]\text{mm} \qquad \text{Eq. (3a)}$$

$$y(t)=[10 \sin(2\pi t)+25]\text{mm} \qquad \text{Eq. (3b)}$$

$$z(t)=[10 \sin(2\pi t)+20.1]\text{mm} \qquad \text{Eq. (3c)}$$

wherein t is a real number in the range 0≥t≥1.

In accordance with the illustrative embodiment, target path 206 is a continuous non-planar curve, but it will be clear to those skilled in the art, after reading this disclosure, how to make and use alternative embodiments of the present invention for any target path (e.g., straight, planar curve, non-planar curve, etc.).

In accordance with the illustrative embodiment, target path 206 does not comprise any discontinuities, but it will be clear to those skilled in the art, after reading this disclosure, how to make and use alternative embodiments of the present invention in which a target path comprises one or more discontinuities.

Figure 3C:
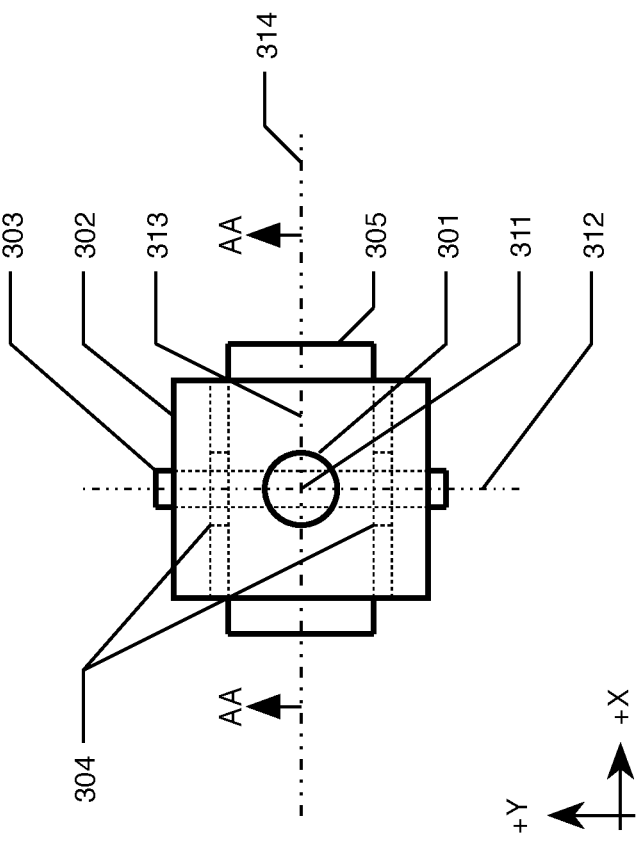
FIG. 3c depicts an orthogonal top view of tamping tool 108 in accordance with the illustrative embodiment of the present invention.

FIGS. 3a, 3b, and 3c depict orthographic front, side, and top views of tamping tool 108 in accordance with the illustrative embodiment. Tamping tool 108 comprises: tool shank 301, wheel bracket 302, wheel axle 303, wheel bushings 304, and wheel 305. Wheel 305 is substantially symmetric around wheel axis 312.

In accordance with the illustrative embodiment, tool shank 301, wheel bracket 302, wheel axle 303, wheel bushings 304, and wheel 305 are each fabricated from stainless steel, but it will be clear to those skilled in the art, after reading this disclosure, how to make and use alternative embodiments of the present invention in which any or all components are fabricated from a different material.

In accordance with the illustrative embodiment, the angular orientation of wheel 305 changes with respect to the coordinate system of additive manufacturing system 100 as it tamps filament 111. In accordance with the illustrative embodiment, the angular orientation of wheel 305 is described in terms of three orthogonal axes:
    (i) a pitch axis, and
    (ii) a yaw axis, and
    (iii) a roll axis.

In accordance with the illustrative embodiment, the general convention for labeling the roll axis, pitch axis, and yaw axis for aircraft is not adopted for wheel 305 because the analogy is not perfect and might cause confusion when applied to wheel 305.

In accordance with the illustrative embodiment, the pitch axis of wheel 305 is designated to be the axis—wheel axis 312—around which wheel 305 exhibits substantial symmetry.

In accordance with the illustrative embodiment, the roll axis of wheel 305 is designated to be roll axis 314 (shown in FIGS. 3a and 3b) because it is, in general, parallel to the direction of travel of wheel 305. In accordance with the illustrative embodiment, roll axis 314 intersects wheel axis 312 but unlike an aircraft, is defined to remain horizontal (i.e., perpendicular to the Z-axis) and not incline or decline as wheel 305 rotates.

In the prior art, the yaw axis of wheel 305 is nip axis 311, as shown in FIGS. 3a, 3b, 3c, and 4 and described in detail below. In contrast, and in accordance with the illustrative embodiment, the yaw axis of wheel 305 is pinch axis 313, as shown in FIGS. 3a, 3b, 3c, and 4 and described in detail below.

Figure 4:
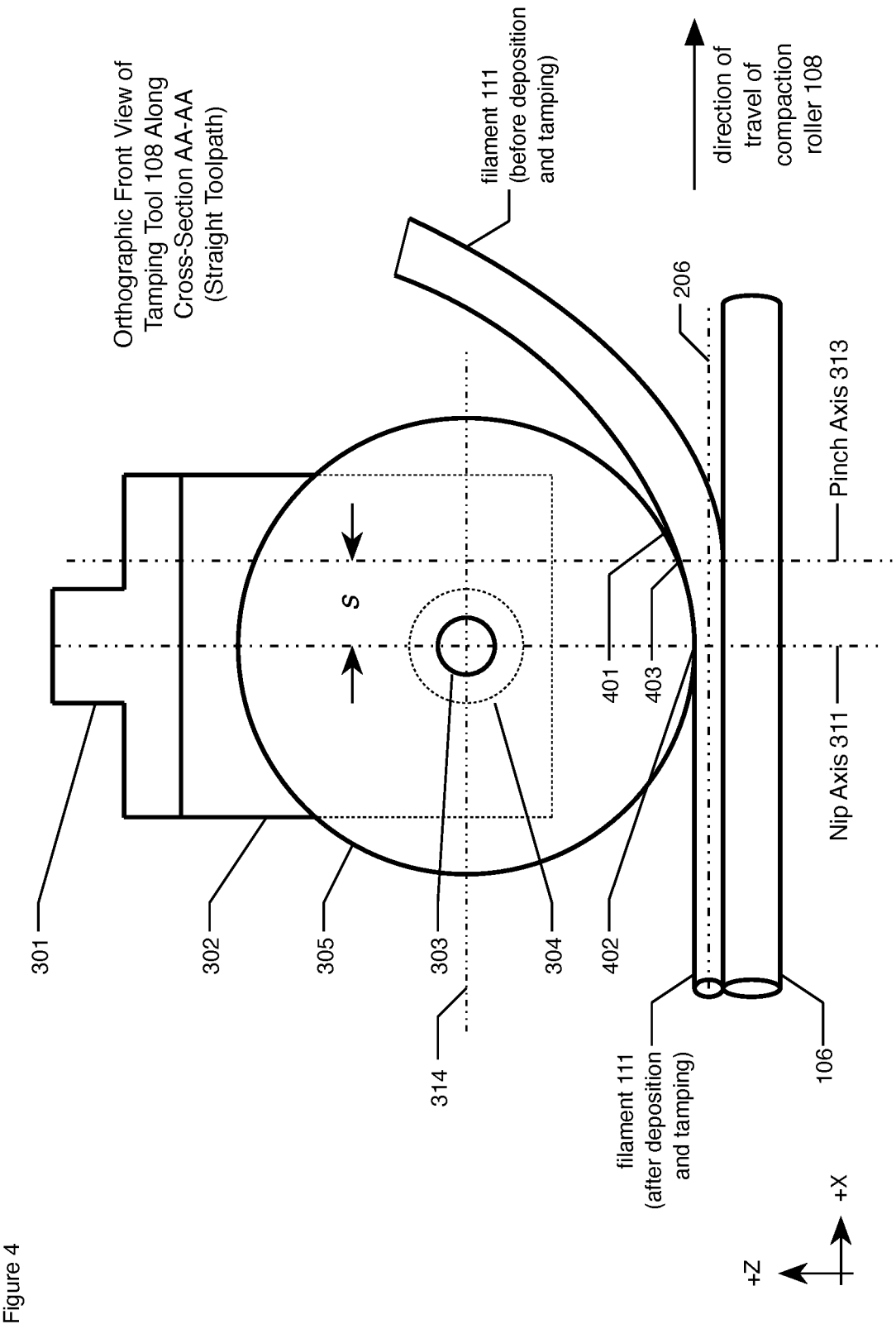
FIG. 4 depicts an orthographic top view of tamping tool 108 along cross-section AA-AA in the context of filament 111 and a straight target path.

FIG. 4 depicts an orthographic front view of tamping tool 108 along cross-section AA-AA in the context of tamping filament 111 onto supporting structure 106 along target path 206.

In accordance with the illustrative embodiment, wheel 305 exerts different amounts of radial force on filament 111 at different places around its circumference. For example, touch line segment 401 is the line segment on the circumferential surface of wheel 305 at which wheel 305 initially touches a length of filament 111. The radial force of wheel 305 on filament 111 at touch line segment 401 approaches zero.

In contrast, nip line segment 402 is the line segment on the circumferential surface of wheel 305 where wheel 305 exerts the maximum radial force on a length of filament 111.

And in further contrast, pinch line segment 403 is the line segment on the circumferential surface of wheel 305 where wheel 305 first pinches a length of filament 111 between the circumferential surface and the supporting structure so that any movement of filament 111 parallel to wheel axis 312 is substantially constrained. It will be clear to those skilled in the art, after reading this disclosure, how to determine—both theoretically and empirically—the location of the pinch line segment for every embodiment of the present invention. Pinch line segment 403 is always between touch line segment 401 and nip line segment 402 on the circumferential surface of wheel 305.

In both the prior art and in accordance with the illustrative embodiment, robot arm 103 tamps filament 111 onto supporting structure 106 by steering wheel 305 along target path 206. There are significant differences, however, between how wheel 305 is steered in the prior art and in the illustrative embodiment. In the prior art, wheel 305 is steered along target path 206:

(i) by moving wheel 305 so that the yaw axis—nip axis 311—intersects and advances along target path 206, and (ii) by turning wheel 305 around the yaw axis—nip axis 311—to keep the roll axis—roll axis 314—substantially parallel to target path 206 at the point where the yaw axis intersects target path 206, and (iii) by turning wheel 305 around the roll axis—roll axis 314—to keep the pitch axis—wheel axis 312—substantially parallel to supporting structure 106 at the point where the yaw axis—nip axis 311—intersects supporting structure 106.

In accordance with the prior art, nip axis 311:

(i) is perpendicular to the pitch axis—wheel axis 312, and
(ii) intersects the pitch axis—wheel axis 312, and
(iii) intersects the midpoint of nip line segment 402.

Figure 5:
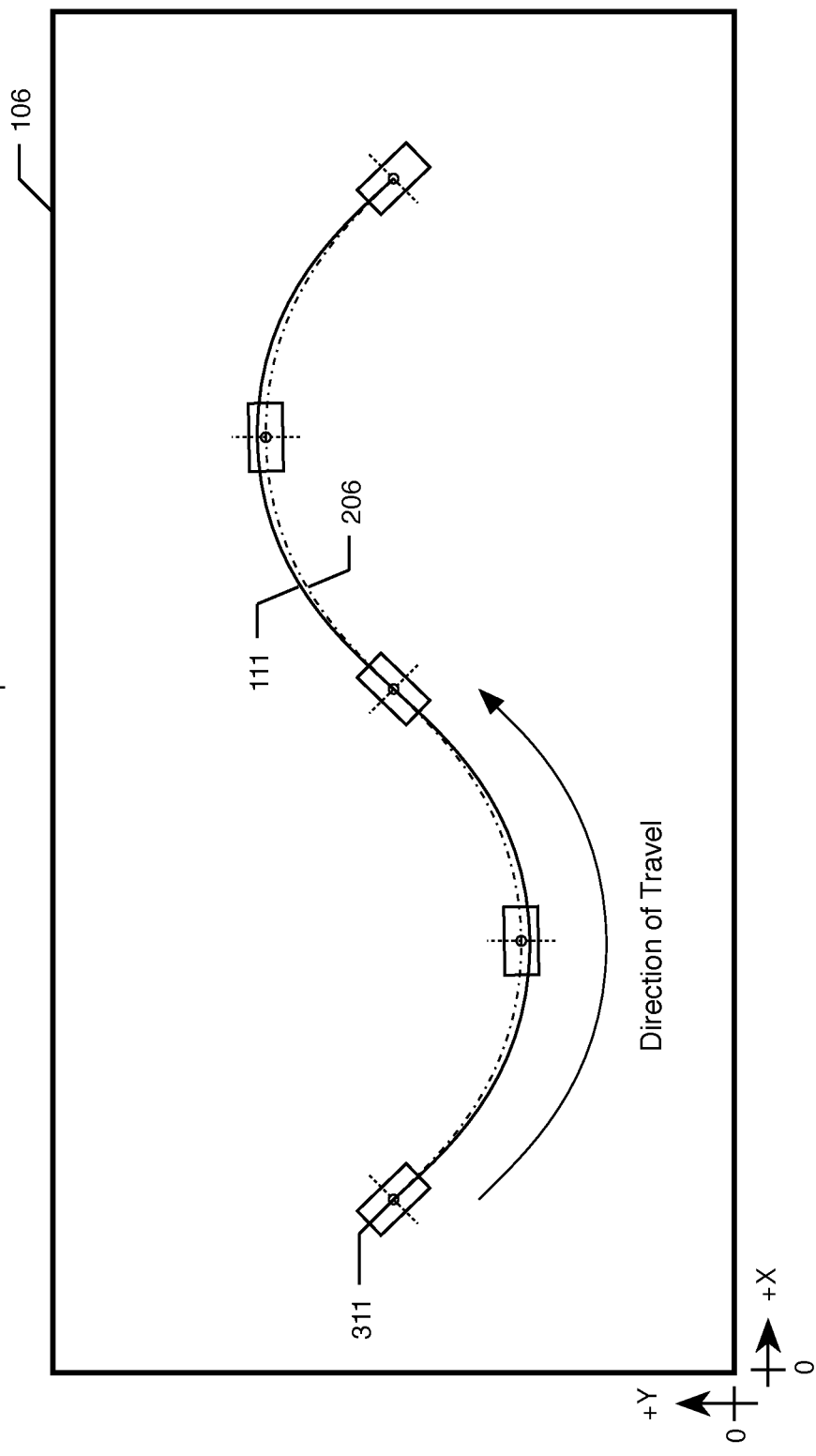
FIG. 5 depicts a top view of the relationship of supporting structure 106, target path 206, and filament 111 after filament 111 has been tamped by wheel 305 and steered using nip axis 311 as the yaw axis, as in the prior art.

FIG. 5 depicts a top view of the relationship of supporting structure 106, target path 206, and filament 111 after filament 111 has been tamped by wheel 305 and steered using nip axis 311 as the yaw axis, as in the prior art. When nip axis 311 is used as the yaw axis for wheel 305, wheel 305 has the detrimental effect of "trapping" the succeeding length of filament 111 off of target path 206 before it is "fixed" in place. In particular, when nip axis 311 is used as the yaw axis for wheel axis 312, wheel 305 traps filament wide on curved portions of target path 206. This is clearly disadvantageous.

In contrast, and in accordance with the illustrative embodiment, wheel 305 is steered along target path 206:

(i) by moving wheel 305 so that the yaw axis—pinch axis 313—intersects and advances along target path 206, and (ii) by turning wheel 305 around the yaw axis—pinch axis 313—to keep the roll axis—roll axis 314—substantially parallel to target path 206 at the point where the yaw axis intersects target path 206, and (iii) by turning wheel 305 around the roll axis—roll axis 314—to keep the pitch axis—wheel axis 312—substantially parallel to supporting structure 106 at the point where the yaw axis—pinch axis 313—intersects supporting structure 106.

It will be clear to those skilled in the art, after reading this disclosure, how to make and use alternative embodiments of the present invention in which wheel 305 is steered in accordance with criteria i or ii or iii or any combination of i, ii, and iii.

In accordance with the illustrative embodiment, pinch axis 313:

(i) is perpendicular to the pitch axis—wheel axis 312, and
(ii) has a non-zero offsets from the pitch axis—wheel axis 312 (i.e., it does not intersect wheel axis 312), and
(iii) intersects pinch line segment 403 (e.g., the midpoint of pinch line segment, etc),
where s is a positive real number.

Figure 7:
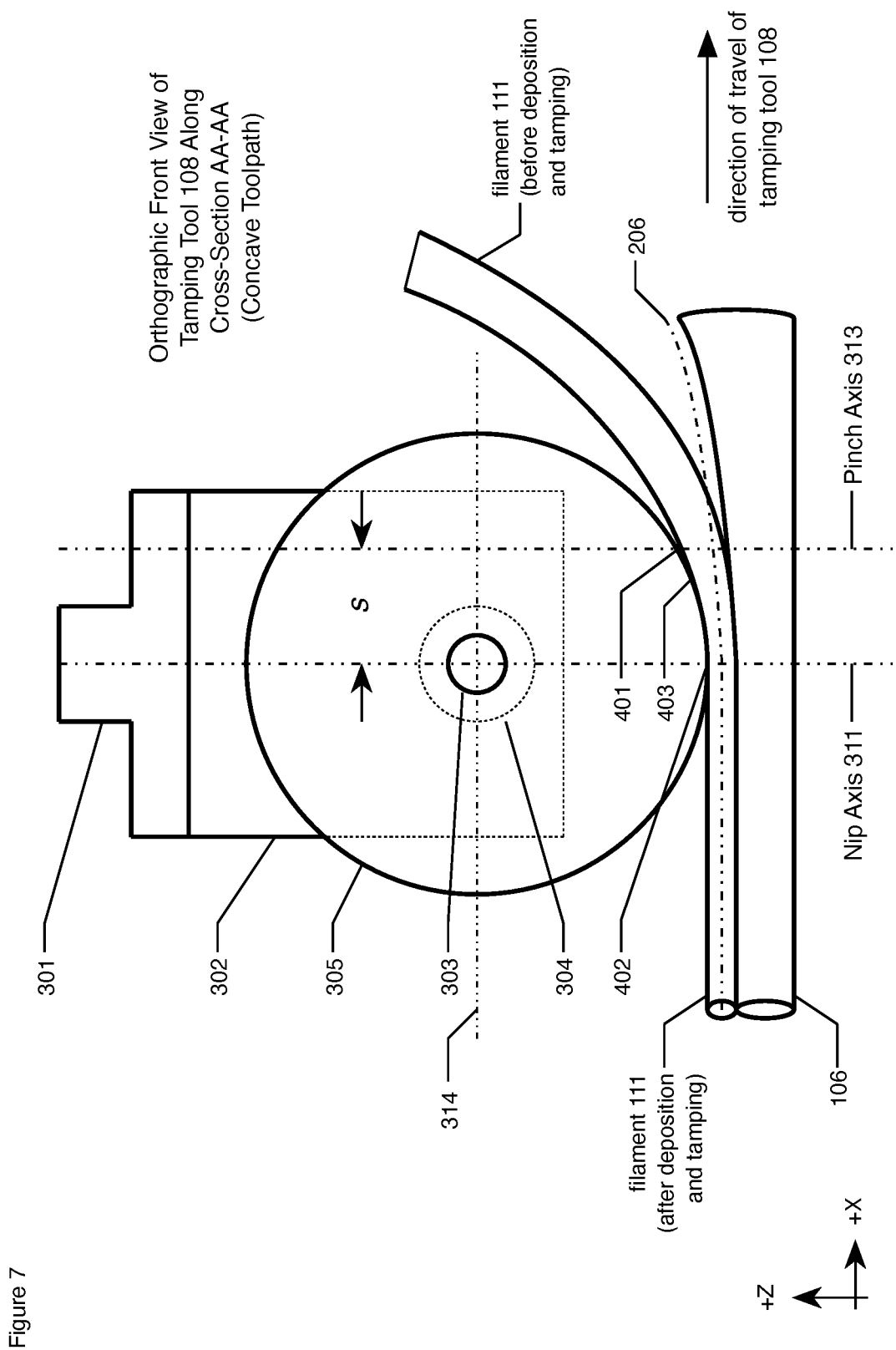
FIG. 7 depicts an orthographic front view of tamping tool 108 along cross-section AA-AA in the context of filament 111 and a concave target path.
Figure 8:
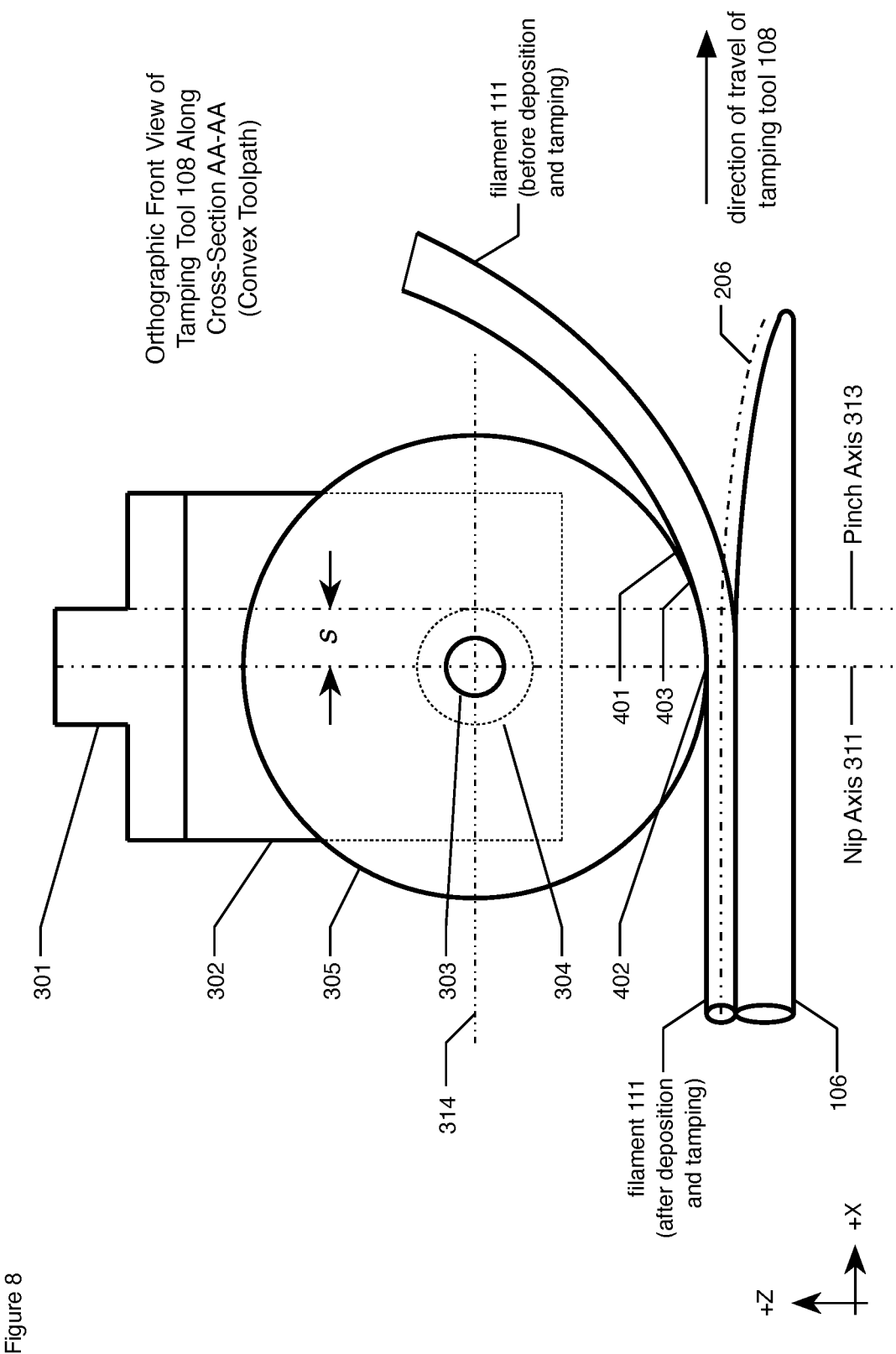
FIG. 8 depicts an orthographic front view of tamping tool 108 along cross-section AA-AA in the context of filament 111 and a convex target path.

The value of the offsets depends on the instantaneous curvature of target path 206 at pinch axis 313 with respect to pinch axis 313. For example, the offsets has one value when target path 206 has no curvature (i.e., is rectilinear) as shown in FIG. 4, a greater value when target path 206 is concave as shown in FIG. 7, and a lesser value when target path 206 is convex, as shown in FIG. 8. In accordance with the illustrative embodiment, the value of the offset s is adjusted dynamically as wheel 305 is steered along target path 206. It will be clear to those skilled in the art, after reading this specification, how to determine—both theoretically and empirically—the value(s) for the offsets.

Figure 6:
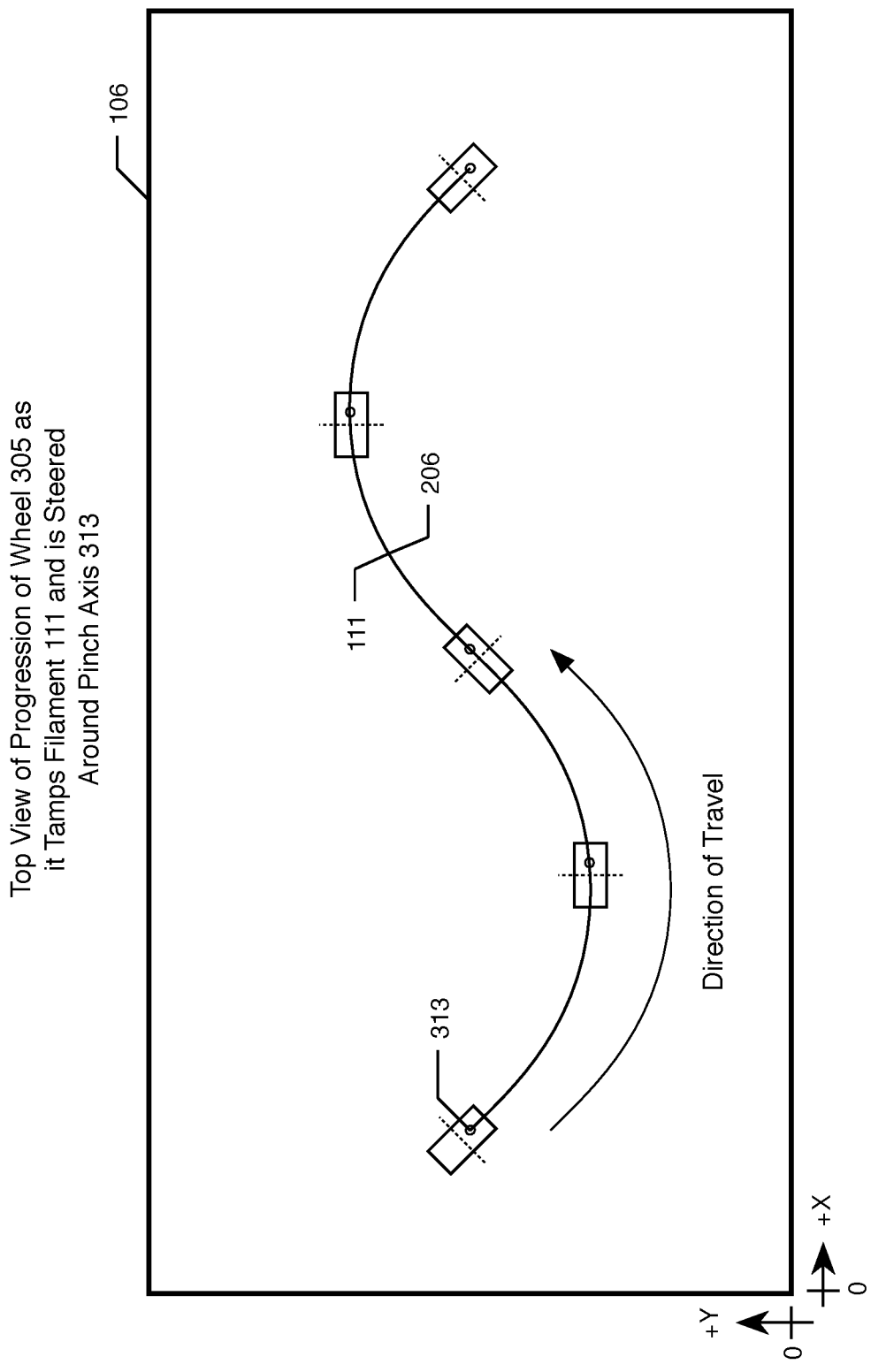
FIG. 6 depicts a top view of the relationship of supporting structure 106, target path 206, and filament 111 after filament 111 has been tamped by wheel 305 and steered using pinch axis 313 as the yaw axis, as in the illustrative embodiment.

FIG. 6 depicts a top view of the relationship of supporting structure 106, target path 206, and filament 111 after filament 111 has been tamped by wheel 305 and steered using pinch axis 313 as the yaw axis, as in the illustrative embodiment. In accordance with the illustrative embodiment, the circumferential surface of wheel 305 precisely tamps filament 111 directly onto target path 206, regardless of the curvature of target path 206 and supporting structure 106.

Figure 9:
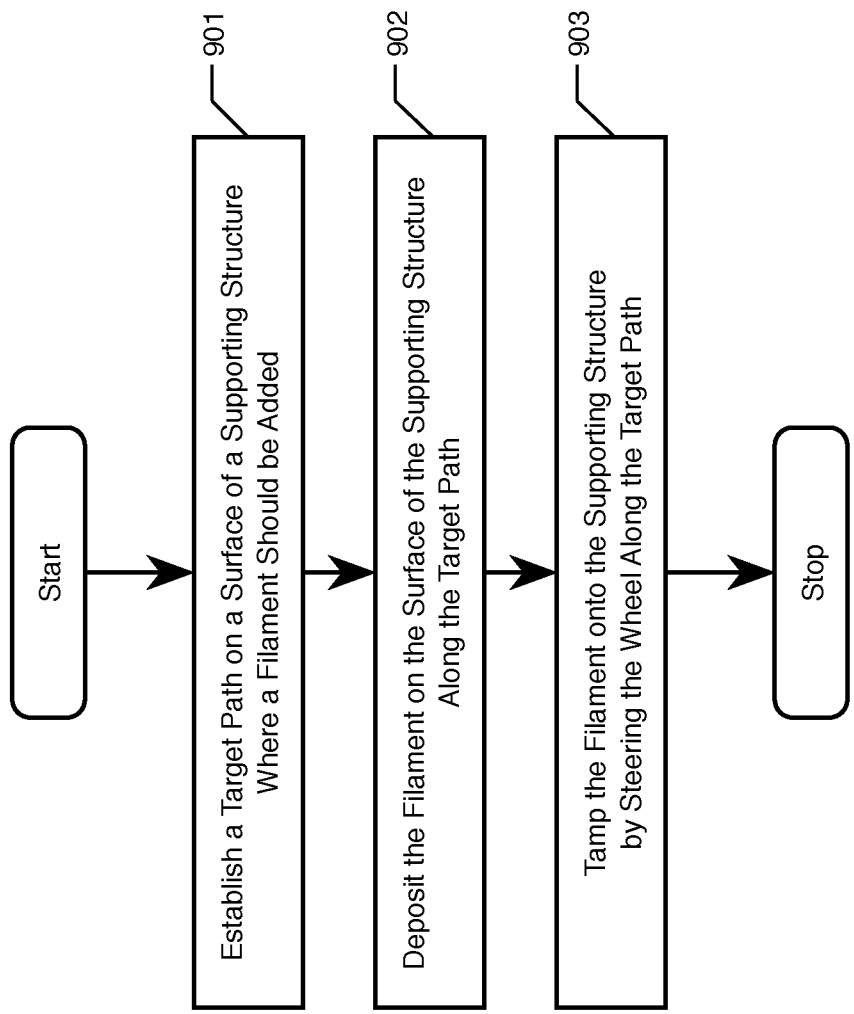
FIG. 9 depicts a flowchart of the operation of the illustrative embodiment.

FIG. 9 depicts a flowchart of the operation of the illustrative embodiment.

At task 901, an engineer using computer-aided design software establishes a target path on a surface of supporting structure 106 where a segment of filament 111 should be deposited and tamped. It will be clear to those skilled in the art how to accomplish task 901.

At task 902, robot arm 103 and deposition head 107—under the control of controller 109—deposit a length of filament 111 along target path 206 on supporting structure 106. It will be clear to those skilled in the art how to accomplish task 902.

At task 903, robot arm and tamping tool 108 tamp the length of filament 111 deposited along target path 206 onto in task 902. Task 903 is described in detail in FIG. 10 and the accompanying text.

It will be clear to those skilled in the art that tasks 902 and 903 are performed concurrently on different lengths of filament 111.

Figure 10:
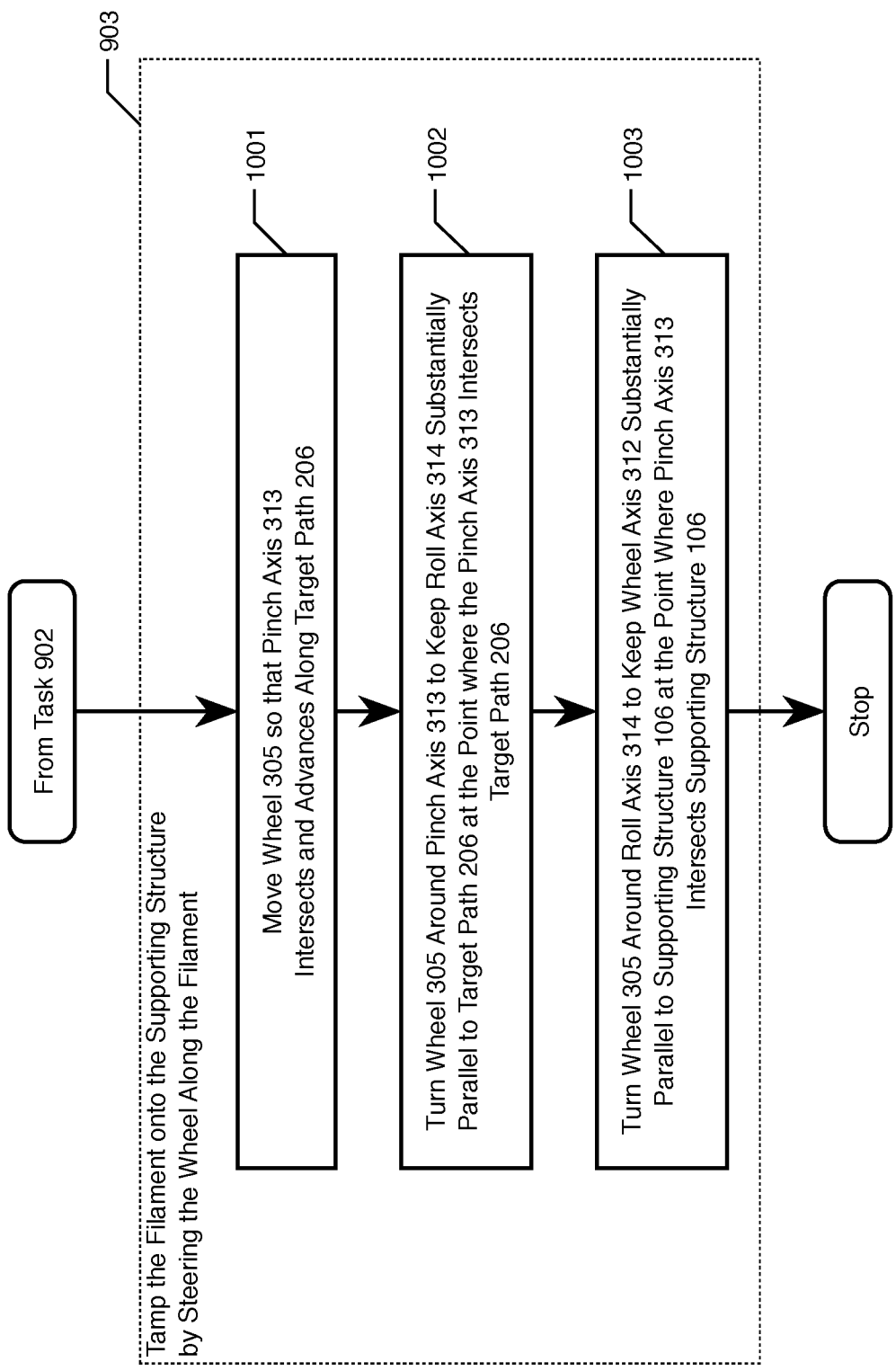
FIG. 10 depicts a flowchart of the details of task 903—tamping filament 111 onto supporting structure 106 with tamping tool 108 by steering wheel 305 along filament 111.

FIG. 10 depicts a flowchart of the details of task 903—tamping filament 111 onto supporting structure 106 with tamping tool 108 by steering wheel 305 along filament 111.

At task 1001, robot arm 103 and tamping tool 108—under the control of controller 109 move wheel 305 so that the yaw axis—pinch axis 313—intersects and advances along target path 206. It will be clear to those skilled in the art, after reading this disclosure, how to make and use embodiments of the present invention that accomplish task 1001.

At task 1002, robot arm 103 and tamping tool 108—under the control of controller 109 turn wheel 305 around the yaw axis—pinch axis 313—to keep the roll axis—roll axis 314—substantially parallel to target path 206 at the point where the yaw axis intersects target path 206. It will be clear to those skilled in the art, after reading this disclosure, how to make and use embodiments of the present invention that accomplish task 1002.

At task 1003, robot arm 103 and tamping tool 108—under the control of controller 109 turn wheel 305 around the roll axis—roll axis 314—to keep the pitch axis—wheel axis 312—substantially parallel to supporting structure 106 at the point where the yaw axis—pinch axis 313—intersects supporting structure 106. It will be clear to those skilled in the art, after reading this disclosure, how to make and use embodiments of the present invention that accomplish task 1003.

What is claimed is:

1. A method comprising:
    depositing a filament on a surface of a supporting structure along a target path; and
    tamping the filament onto the supporting structure with a wheel by steering the wheel along the filament;
    wherein the wheel comprises:
        (i) a pitch axis around which the wheel is substantially symmetric; and
        (ii) a circumferential surface that comprises:
            (ii-a) a nip line segment where the wheel exerts maximum radial force on a first length of the filament, and
            (ii-b) a pinch line segment where the wheel first pinches a second length of the filament between the circumferential surface and the supporting structure so that any movement of the second length of the filament parallel to the pitch axis is substantially constrained; and
        (iii) a yaw axis that:
            (iii-a) is perpendicular to the pitch axis, and
            (iii-b) has a non-zero offset s from the pitch axis, wherein s is a positive real number, and
            (iii-c) intersects the pinch line segment; and
        (iv) a roll axis that intersects the pitch axis and the yaw axis and is perpendicular to the pitch axis and the yaw axis; and
    wherein steering the wheel comprises moving the wheel so that the yaw axis intersects and advances along the target path.

2. The method of claim 1 wherein steering the wheel further comprises turning the wheel around the yaw axis to keep the roll axis substantially parallel to the target path at the point where the yaw axis intersects the target path.

3. The method of claim 1 wherein steering the wheel further comprises turning the wheel around the roll axis to keep the pitch axis parallel to the supporting structure at the point where the yaw axis intersects the supporting structure.

4. The method of claim 1 wherein steering the wheel further comprises dynamically adjusting the value of the offset s as a function of the curvature of the target path.

5. The method of claim 1 wherein the filament is an anisotropic fiber-reinforced thermoplastic filament.

6. The method of claim 1 wherein the target path is a planar curve.

7. The method of claim 1 wherein the target path is a non-planar curve.

8. A method comprising:
    depositing a filament on a surface of a supporting structure along a target path; and
    tamping the filament onto the supporting structure with a wheel by steering the wheel along the filament;
    wherein the wheel comprises:
        (i) a pitch axis around which the wheel is substantially symmetric; and
        (ii) a circumferential surface that comprises:
            (ii-a) a nip line segment where the wheel exerts maximum radial force on a first length of the filament, and
            (ii-b) a pinch line segment where the wheel first pinches a second length of the filament between the circumferential surface and the supporting structure so that any movement of the second length of the filament parallel to the pitch axis is substantially constrained; and
        (iii) a yaw axis that:
            (iii-a) is perpendicular to the pitch axis, and
            (iii-b) has a non-zero offset s from the pitch axis, wherein s is a positive real number, and
            (iii-c) intersects the pinch line segment; and
        (iv) a roll axis that intersects the pitch axis and the yaw axis and is perpendicular to the pitch axis and the yaw axis; and
    wherein steering the wheel comprises turning the wheel around the yaw axis to keep the roll axis substantially parallel to the target path at the point where the yaw axis intersects the target path.

9. The method of claim 8 wherein steering the wheel further comprises turning the wheel around the roll axis to keep the pitch axis parallel to the supporting structure at the point where the yaw axis intersects the supporting structure.

10. The method of claim 8 wherein steering the wheel further comprises dynamically adjusting the value of the offset s as a function of the curvature of the target path.

11. The method of claim 8 wherein the filament is an anisotropic fiber-reinforced thermoplastic filament.

12. The method of claim 8 wherein the target path is a planar curve.

13. The method of claim 8 wherein the target path is a non-planar curve.

14. A method comprising:

depositing a filament on a surface of a supporting structure along a target path; and tamping the filament onto the supporting structure with a wheel by steering the wheel along the filament;

wherein the wheel comprises:
- (i) a pitch axis around which the wheel is substantially symmetric; and
- (ii) a circumferential surface that comprises:
  - (ii-a) a nip line segment where the wheel exerts maximum radial force on a first length of the filament, and
  - (ii-b) a pinch line segment where the wheel first pinches a second length of the filament between the circumferential surface and the supporting structure so that any movement of the second length of the filament parallel to the pitch axis is substantially constrained; and
- (iii) a yaw axis that:
  - (iii-a) is perpendicular to the pitch axis, and
  - (iii-b) has a non-zero offset s from the pitch axis, wherein s is a positive real number, and
  - (iii-c) intersects the pinch line segment; and
- (iv) a roll axis that intersects the pitch axis and the yaw axis and is perpendicular to the pitch axis and the yaw axis; and wherein steering the wheel comprises turning the wheel around the roll axis to keep the pitch axis parallel to the supporting structure at the point where the yaw axis intersects the supporting structure.

15. The method of claim 14 wherein steering the wheel further comprises dynamically adjusting the value of the offset s as a function of the curvature of the target path.

16. The method of claim 14 wherein the filament is an anisotropic fiber-reinforced thermoplastic filament.

17. The method of claim 14 wherein the target path is a planar curve.

18. The method of claim 14 wherein the target path is a non-planar curve.

* * * * *